Patented Feb. 12, 1952

2,584,975

UNITED STATES PATENT OFFICE 2,584,975

OPTICAL GLASS

William H. Armistead, Corning, N. Y., assignor to Corning Glass Works, Corning, N. Y., a corporation of New York No Drawing. Application March 27, 1951, Serial No. 217,890

15 Claims. (Cl. 106—53)

This application, which is a continuation-in-part of my pending application Serial Number 26,930, filed May 13, 1948, relates to high refractive index glasses suitable for use in anomalous achromat optical systems particularly adapted for use as photographic lenses.

Anomalous achromat optical systems employ a combination of two glasses possessing refractive indices and dispersive indices such that chromatic aberration is corrected and secondary spectrum is minimized. The refractive indices for the D line, $nD$, of the two glasses should differ as widely as possible, preferably by at least 0.13, and their dispersive indices or nu values, $v$, should be relatively high. The glass of higher refractive index should preferably have the higher nu value, and desirably has a refractive index over 1.65 and a nu value over 45.

Although glasses which have such a high refractive index do not ordinarily possess such a high nu value, some borates and borosilicates containing $La_2O_3$ have been shown to possess these desirable properties. Borate glasses in general are notoriously unstable, however, and such borosilicates are also not wholly satisfactory for the following reasons:

The amount of $La_2O_3$ which can be incorporated in borosilicate glasses is limited by its low solubility therein. The resulting glasses, moreover, have an objectionable tendency to devitrify or crystallize on working or slow cooling. The chemical stability of these glasses can be improved by the presence of a few percent of BeO, which minimizes their crystallization tendency; but the use of BeO likewise is limited by its low solubility in such glasses.

The ability of $ThO_2$ to increase the refractive index and the nu value of borosilicate glasses is known, and its use in $La_2O_3$-containing borosilicates has been proposed. The presence of thorium becomes objectionable, however, when such glasses are to be used in lenses and other photographic elements because of the fogging of films and similar photosensitive materials as a result of the radioactivity of the thorium compounds contained therein.

I have now discovered that CaO has an unexpectedly strong solvent effect on both $La_2O_3$ and BeO in borosilicate glasses and that the presence of CaO in such glasses makes it possible to increase the $La_2O_3$ and the BeO contents very substantially without causing devitrification. I have also found that $ThO_2$ can thereby be omitted from such glasses without any substantial effect on their refractive index and nu value. Such glasses are thus particularly suitable for use in photographic lenses and for other purposes where the radioactivity of thorium or its compounds would be disadvantageous.

In their broadest scope the new compositions consist basically of thorium-free glasses which comprise essentially 5% to 40% $SiO_2$, 5% to 40% $B_2O_3$, 5% to 35% $La_2O_3$, 2% to 15% BeO and 10% to 60% CaO. In addition to BeO and CaO the following other divalent metal oxides may be included in the indicated proportions: up to 30% MgO, up to 60% ZnO, up to 60% SrO, up to 60% CdO, up to 60% BaO, and up to 20% PbO. The total $SiO_2$ and $B_2O_3$ should be from 20% to 45%, the total divalent metal oxides should be between 20% and 75%, and the total divalent metal oxides plus $La_2O_3$ should be between 55% and 80%. When the total $SiO_2$ and $B_2O_3$ is relatively low, the divalent metal oxides should preferably include a heavier metal oxide such as BaO and CdO in substantial amount in order to diminish the crystallization tendency. If desired, the glasses may also include up to 11% of $TiO_2$ or $ZrO_2$ or $HfO_2$ or up to 11% of a combination of such oxides, or up to 20% $Bi_2O_3$, or up to 20% $Sb_2O_3$.

Best results are obtained with glasses containing 10% to 25% $SiO_2$, 10% to 25% $B_2O_3$, 5% to 35% $La_2O_3$, 2% to 12% BeO, 15% to 30% CaO, and up to 11% of one or more of the oxides $TiO_2$, $ZrO_2$, and $HfO_2$, with desirably up to 35% of CdO or BaO, the total bivalent metal oxides being 20% to 45% and the total bivalent metal oxides plus $La_2O_3$ being 55% to 65%.

Only the indicated ranges of constituents produce glasses which yield the desired result and variations in their proportions should be confined within the limits of such ranges for the following reasons:

Devitrification results from an excess of $La_2O_3$ and from either an excess or a deficiency of any of the other essential constituents while a low nu value relative to the refractive index results from a deficiency of $La_2O_3$.

An excess of $B_2O_3$ or a deficiency of $SiO_2$ or $B_2O_3$ causes an objectionable decrease in the chemical durability of the glass.

Oxides of the other metals of the second periodic group in excessive amounts also cause devitrification while an excess of PbO objectionably lowers the nu value.

The oxides of titanium, zirconium and hafnium raise the refractive index and improve the chemical stability of the glass. Their solubility is increased by the presence of CaO and they may be used in amounts up to about 11%. Of these oxides $ZrO_2$ is the most desirable from the standpoint of cost and effectiveness while $HfO_2$ is least desirable due to its high cost and $TiO_2$ tends to lower the nu value.

The oxides of antimony and bismuth have an effect similar to lead oxide and may be used within the indicated amounts.

Alumina lowers the nu value and reduces the solubility of $TiO_2$, $ZrO_2$ and $HfO_2$ and is preferably omitted although it may be used as an aid in preventing crystallization.

Alkali metal oxides lower the chemical durability and, excepting lithia, they also lower the nu value. Hence they should be avoided unless needed to adjust physical properties.

The following compositions in percent by weight as calculated from their batches illustrate but do not limit the invention:

|  | I | II | III | IV | V | VI | VII | VIII | IX | X |
|---|---|---|---|---|---|---|---|---|---|---|
| $SiO_2$ | 15 | 15 | 15 | 15 | 15 | 15 | 20 | 5 | 20 | 20 |
| $B_2O_3$ | 15 | 15 | 15 | 15 | 15 | 15 | 20 | 20 | 20 | 20 |
| $La_2O_3$ | 10 | 20 | 20 | 20 | 20 | 20 | 30 | 10 | 5 | 10 |
| BeO | 5 | 5 | 5 | 5 | 5 | 5 | 5 | 7.5 | 5 | 10 |
| CaO | 20 | 20 | 20 | 20 | 20 | 20 | 20 | 15 | 50 | 40 |
| BaO | 20 |  |  | 10 | 10 | 20 |  | 10 |  |  |
| ZnO |  | 10 |  | 10 |  |  |  |  |  |  |
| CdO |  | 10 | 20 |  | 10 |  |  |  |  |  |
| SrO |  |  |  |  |  |  |  | 15 |  |  |
| PbO | 10 |  |  |  |  |  |  |  |  |  |
| $ZrO_2$ | 5 | 5 | 5 | 5 | 5 | 5 | 5 | 7.5 |  |  |
| $nD$ | 1.702 | 1.723 | 1.726 | 1.710 | 1.713 | 1.700 | 1.687 | 1.667 | 1.654 | 1.658 |
| $v$ | 45.9 | 47.7 | 47.8 | 49.6 | 49.7 | 51.6 | 53.8 | 54.1 | 55.3 | 56.8 |

Examples 2 to 7 are glasses whose optical properties and other characteristics are such as to make them especially valuable in anomalous achromat systems. These glasses are illustrative of the following range of compositions having properties equivalent to the above glasses: $SiO_2$ 15 to 20%, $B_2O_3$ 15 to 20%, $La_2O_3$ 20 to 30%, BeO about 5%, CaO about 20% and $ZrO_2$ about 5%, with preferably up to 20% of CdO or BaO, the total bivalent metal oxides being 25% to 45%, and the total bivalent metal oxides plus $La_2O_3$ being 55 to 65%.

I claim:

1. A transparent thorium-free optical glass comprising 5–40% $SiO_2$, 5–40% $B_2O_3$, 5–35% $La_2O_3$, and at least two divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO and CaO in the above-indicated proportions, the total divalent metal oxides being between 20% and 75%, and the total divalent metal oxides plus $La_2O_3$ being between 55% and 80%.

2. A transparent thorium-free optical glass comprising 5–40% $SiO_2$, 5–40% $B_2O_3$, 5–35% $La_2O_3$, up to 11% of an oxide selected from the group consisting of $TiO_2$, $ZrO_2$ and $HfO_2$, and at least two divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO and CaO in the above-indicated proportions, the total divalent metal oxides being between 20% and 75% and the total divalent metal oxides plus $La_2O_3$ being between 55% and 80%.

3. A transparent thorium-free optical glass comprising 5–40% $SiO_2$, 5–40% $B_2O_3$, 5–35% $La_2O_3$, up to 11% $ZrO_2$, and at least two divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO and CaO in the above-indicated proportions, the total divalent metal oxides being between 20% and 75%, and the total divalent metal oxides plus $La_2O_3$ being between 55% and 80%.

4. A transparent thorium-free optical glass comprising 5–40% $SiO_2$, 5–40% $B_2O_3$, 5–35% $La_2O_3$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO and BaO in the above-indicated proportions, the total divalent metal oxides being between 20% and 75%, and the total divalent metal oxides plus $La_2O_3$ being between 55% and 80%.

5. A transparent thorium-free optical glass comprising 5–40% $SiO_2$, 5–40% $B_2O_3$, 5–35% $La_2O_3$, up to 11% $ZrO_2$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO and BaO in the above-indicated proportions, the total divalent metal oxides being between 20% and 75%, and the total divalent metal oxides plus $La_2O_3$ being between 55% and 80%.

6. A transparent thorium-free optical glass comprising 5–40% $SiO_2$, 5–40% $B_2O_3$, 5–35% $La_2O_3$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO, and CdO in the above-indicated proportions, the total divalent metal oxides being between 20% and 75%, and the total divalent metal oxides plus $La_2O_3$ being between 55% and 80%.

7. A transparent thorium-free optical glass comprising 5–40% $SiO_2$, 5–40% $B_2O_3$, 5–35% $La_2O_3$, up to 11% $ZrO_2$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO and CdO in the above-indicated proportions, the total divalent metal oxides being between 20% and 75%, and the total divalent metal oxides plus $La_2O_3$ being between 55% and 80%.

8. A transparent thorium-free optical glass comprising 5–40% $SiO_2$, 5–40% $B_2O_3$, 5–35% $La_2O_3$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, CdO, and BaO in the above-indicated proportions, the total divalent metal oxides being between 20% and 75% and the total divalent metal oxides plus $La_2O_3$ being between 55% and 80%.

9. A transparent thorium-free optical glass comprising 5–40% $SiO_2$, 5–40% $B_2O_3$, 5–35% $La_2O_3$, up to 11% $ZrO_2$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, CdO, and BaO in the above-indicated proportions, the total divalent metal oxides being between 20% and 75%, and the total divalent metal oxides plus $La_2O_3$ being between 55% and 80%.

10. A transparent thorium-free optical glass comprising 5–40% $SiO_2$, 5–40% $B_2O_3$, 5–35% $La_2O_3$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, SrO, and BaO in the above-indicated proportions, the total divalent metal oxides being between 20% and 75% and the total divalent metal oxides plus $La_2O_3$ being between 55% and 80%.

11. A transparent thorium-free optical glass comprising 5–40% $SiO_2$, 5–40% $B_2O_3$, 5–35% $La_2O_3$, up to 11% $ZrO_2$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, SrO, and BaO in the above-indicated proportions, the total divalent metal oxides being between 20% and 75% and the total divalent metal oxides plus $La_2O_3$ being between 55% and 80%.

12. A transparent thorium-free optical glass comprising 10–25% $SiO_2$, 10–25% $B_2O_3$, 5–35% $La_2O_3$, up to 11% of an oxide selected from the group consisting of $TiO_2$, $ZrO_2$ and $HfO_2$, 2–12% BeO, 15–30% CaO and up to 35% BaO, the total divalent metal oxides being between 20% and 45%, and the total divalent metal oxides plus $La_2O_3$ being between 55% and 65%.

13. A transparent thorium-free optical glass comprising 10–25% $SiO_2$, 10–25% $B_2O_3$, 5–35% $La_2O_3$, up to 11% of an oxide selected from the group consisting of $TiO_2$, $ZrO_2$, and $HfO_2$, and divalent metal oxides including 2–12% BeO, 15–30% CaO, and up to 35% CdO, the total divalent metal oxides being between 20% and 45%, and the total divalent metal oxides plus $La_2O_3$ being between 55% and 65%.

14. A transparent thorium-free optical glass comprising 15–20% $SiO_2$, 15–20% $B_2O_3$, 20–30% $La_2O_3$, about 5% $ZrO_2$, about 5% BeO, and about 20% CaO and up to 20% BaO, the total divalent metal oxides being between 25% and 45% and the total divalent metal oxides plus $La_2O_3$ being between 55% and 65%.

15. A transparent thorium-free optical glass comprising 15–20% $SiO_2$, 15–20% $B_2O_3$, 20–30% $La_2O_3$, about 5% $ZrO_2$, about 5% BeO, about 20% CaO and up to 20% CdO, the total divalent metal oxides being between 25% and 45% and the total divalent metal oxides plus $La_2O_3$ being between 55% and 65%.

WILLIAM H. ARMISTEAD.

No references cited.